US009448365B2

(12) United States Patent
Fletcher

(10) Patent No.: US 9,448,365 B2
(45) Date of Patent: Sep. 20, 2016

(54) TRUNK GLAND ADAPTERS AND RELATED TRUNK GLAND UNITS AND METHODS OF CONNECTING TRUNK CABLES TO FIBER OPTIC ENCLOSURES

(71) Applicant: CommScope, Inc. of North Carolina, Hickory, NC (US)

(72) Inventor: Neil C. Fletcher, Southampton (GB)

(73) Assignee: COMMSCOPE, INC. OF NORTH CAROLINA, Hickory, NC (US)

( * ) Notice: Subject to any disclaimer, the term of this patent is extended or adjusted under 35 U.S.C. 154(b) by 0 days.

(21) Appl. No.: 14/587,016

(22) Filed: Dec. 31, 2014

(65) Prior Publication Data

US 2016/0187589 A1 Jun. 30, 2016

(51) Int. Cl.
*G02B 6/36* (2006.01)
*G02B 6/44* (2006.01)
*G02B 6/42* (2006.01)

(52) U.S. Cl.
CPC ........... *G02B 6/3644* (2013.01); *G02B 6/4248* (2013.01); *G02B 6/4471* (2013.01)

(58) Field of Classification Search
CPC . G02B 6/3644; G02B 6/4248; G02B 6/4471
USPC ........................................................ 385/138
See application file for complete search history.

(56) References Cited

U.S. PATENT DOCUMENTS

| 5,416,874 | A | 5/1995 | Giebel et al. |
| 6,487,344 | B1* | 11/2002 | Naudin ................ G02B 6/4471 385/100 |
| 6,681,795 | B2 | 1/2004 | Beals et al. |
| 2008/0170375 | A1 | 7/2008 | Jablonski et al. |
| 2009/0003777 | A1 | 1/2009 | Feldner |
| 2009/0025977 | A1 | 1/2009 | Anderson et al. |
| 2009/0059552 | A1 | 3/2009 | Womack et al. |
| 2011/0033157 | A1* | 2/2011 | Drouard ............... G02B 6/4477 385/77 |
| 2012/0020628 | A1 | 1/2012 | Chan et al. |
| 2013/0028568 | A1 | 1/2013 | Beamon et al. |
| 2013/0287360 | A1 | 10/2013 | Beamon et al. |
| 2015/0260936 | A1* | 9/2015 | Newbury ............. G02B 6/4471 385/135 |

FOREIGN PATENT DOCUMENTS

WO    WO 2008/115795 A1    9/2008

OTHER PUBLICATIONS

"Heyco® Snap-In Cordgrip Strain Reliefs—Straight-Thru"—Product Quick Specs, www.heyco.com/Strain_Relief_Bushing/product.dfm?product=Snap-In-Strain-Relie . . . , accessed Oct. 2, 1014.
International Search Report Corresponding to International Application No. PCT/US2015/010165; Date of Mailing: Jul. 22, 2015; 15 Pages.
Invitation to Pay Additional Fees Corresponding to International Application No. PCT/US2015/010165; Date of Mailing: May 11, 2015; 6 Pages.

* cited by examiner

*Primary Examiner* — Ryan Lepisto
(74) *Attorney, Agent, or Firm* — Merchant & Gould P.C.

(57) ABSTRACT

Trunk gland adapters include an adapter body having an internal bore that is sized to receive a trunk cable gland so that a front end of the trunk cable gland extends through a front opening of the internal bore and a plurality of attachment clips that are configured to releasably attach the adapter body to a mounting aperture in a wall of a fiber optic enclosure. Related trunk gland units and methods of routing a trunk cable into an enclosure are also disclosed.

18 Claims, 7 Drawing Sheets

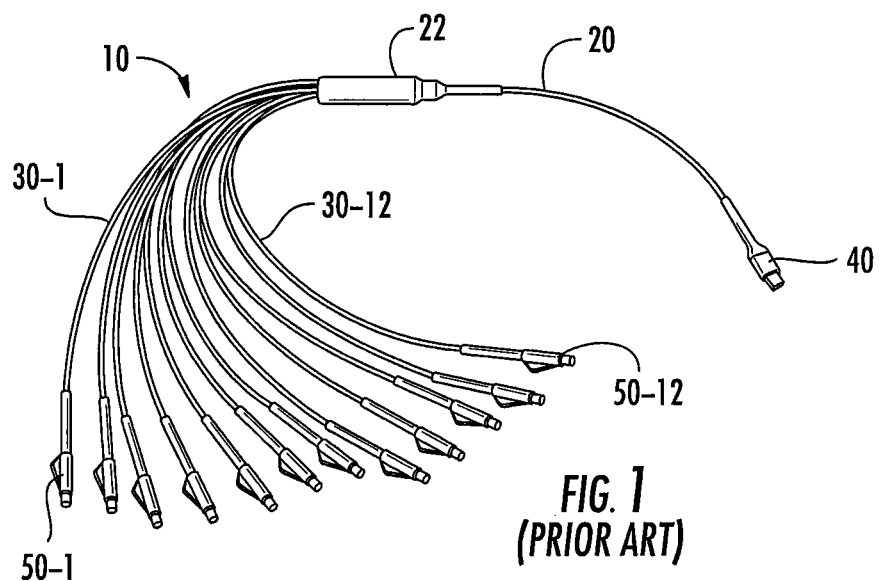
FIG. 1
(PRIOR ART)
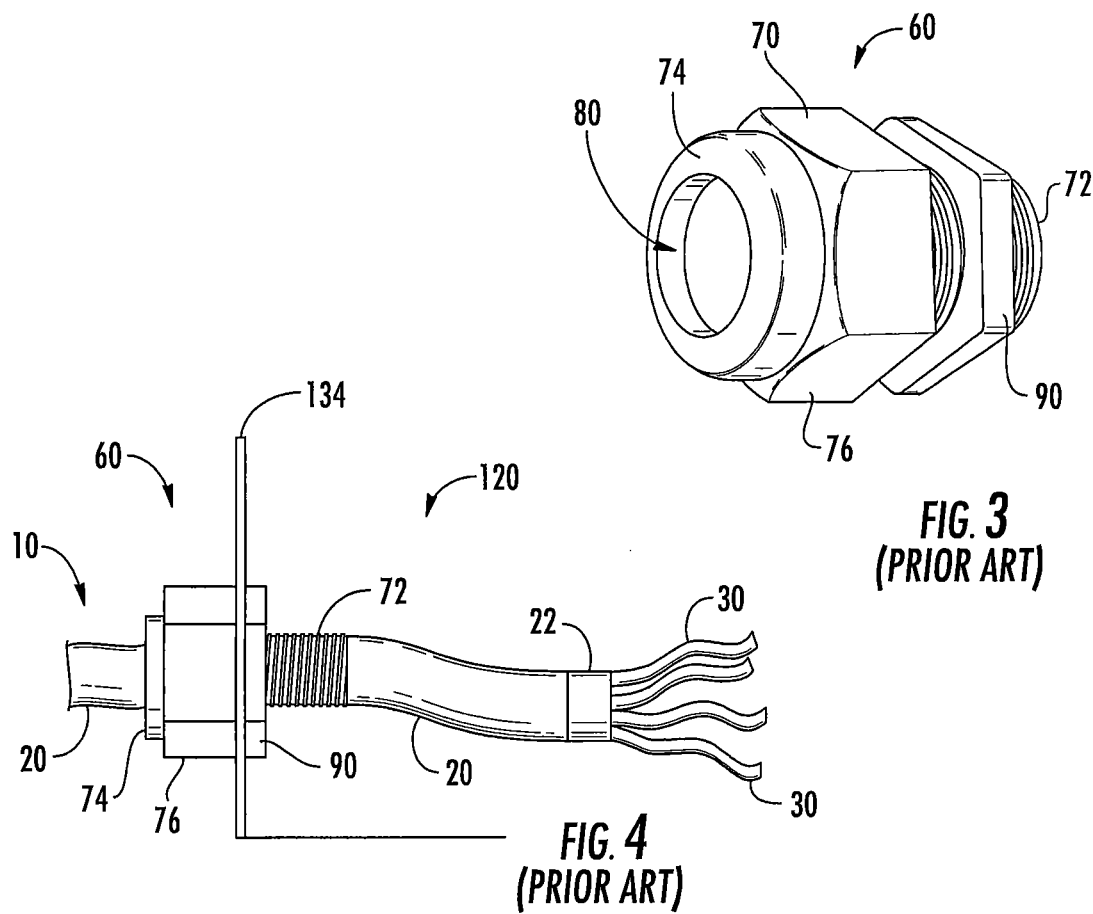
FIG. 3
(PRIOR ART)
FIG. 4
(PRIOR ART)

TRUNK GLAND ADAPTERS AND RELATED TRUNK GLAND UNITS AND METHODS OF CONNECTING TRUNK CABLES TO FIBER OPTIC ENCLOSURES

FIELD OF THE INVENTION

The present invention relates to communications cabling and, more particularly, to fiber optic trunk cables that are connected to fiber optic enclosures.

BACKGROUND

Fiber optic cables are used in a wide variety of applications to carry high data rate communications signals between two (or more) devices. Typically a fiber optic cable will include at least two optical fibers, namely a first optical fiber that carries transmissions from a first device to a second device and a second optical fiber that carries transmissions from the second device to the first device. By providing at least two optical fibers between each pair of devices, duplex communications may be supported without having optical signals travel along the same optical fiber in different directions, which can potentially lead to interference.

Fiber optic "trunk cables" refer to fiber optic cables that are capable of supporting communications between multiple users or devices. Fiber optic trunk cables include at least four optical fibers, and often include a much larger number of optical fibers such as, for example, between twelve and two hundred eighty-eight optical fibers. The optical fibers are typically terminated with connectors such, as for example, multi-fiber push-on ("MPO") type connectors. The trunk cable may include a transition point where the main cable of the trunk cable is broken out into a plurality of smaller break-out cables that each include a subset of the optical fibers from the main cable. By way of example, a fiber optic trunk cable that has ninety-six optical fibers within the main cable thereof may have eight breakout cables on one or both ends thereof, where each breakout cable includes twelve of the ninety-six optical fibers. An end of each breakout cable may be terminated with a fiber optic connector such as, for example, an MPO connector. The fiber optic connector that terminates each breakout cable may be connected to a mating fiber optic connector of a fiber optic enclosure such as, for example, a fiber optic transceiver, a fiber optic patch panel, a fiber optic shelf enclosure or the like.

FIG. 1 is a perspective view of a conventional fiber optic trunk cable 10. As shown in FIG. 1, the trunk cable 10 includes a main cable 20, a plurality of breakout cables 30-1 through 30-12, a main cable connector 40 and a plurality of breakout cable connectors 50-1 through 50-12. In the depicted embodiment, the main cable 20 includes twenty-four optical fibers, and the main cable connector 40 is a twenty-four optical fiber connector. The main cable 20 includes a breakout section 22 where the main cable 20 splits into the twelve breakout cables 30-1 through 30-12. Each breakout cable 30 includes two optical fibers, and is terminated with a duplex fiber optic connector 50.

In many applications, a fiber optic trunk cable such as trunk cable 10 may be routed into a fiber optic enclosure. Typically the breakout cables 30 are fully received within the fiber optic enclosure, as is a small segment of the main cable 20. Inside the fiber optic enclosure, the connectors 50 on each breakout cables 30 are connected to fiber optic connectors that are within and/or are mounted on the enclosure.

By way of example, as shown in FIG. 2A, a fiber optic shelf unit 100 may be provided that includes a plurality of shelves 110. A fiber optic enclosure 120 may be mounted in each shelf 110 of the shelf unit 100. As shown in FIG. 2B, each fiber optic enclosure 120 may comprise an open box 130 that has a plurality of fiber optic adapters 140 mounted on a front wall 132 thereof, one or more apertures 150 for trunk cables 10 in a back wall 134 thereof, and fiber optic cable routing features 160 within the box 130 that may be used to ensure that the breakout cables 30 are not bent beyond an acceptable bend radius. In such applications, one or more trunk cables 10 may be routed into the interior of the box 130 through the apertures 150 so that the breakout sections 22 of the trunk cables 10 are within the interior of the box 130. Excess length of each breakout cable 30 may be wound around the fiber optic cable routing features 160. The connectors 50 on each breakout cable 30 may be inserted into the rear side of the respective fiber optic adapters 140 that are mounted on the front wall 132. Other fiber optic cables such as fiber optic patch cords (not shown) may then be mounted in the front side of the fiber optic adapters 140 to connect the trunk cable 10 to other fiber optic apparatus (not shown) that the fiber patch cords are connected to. The fiber optic adapters 140 may be any appropriate fiber optic adapters such as, for example, LC adapters, SC adapters, MPO adapters, etc.

Tension may be inadvertently applied to trunk cables such as trunk cable 10 after the trunk cable 10 is installed in a fiber optic enclosure 120. If this occurs, the tension may be transferred to the optical connectors 50. In order reduce or prevent this from occurring, a device known as a trunk cable gland may be mounted in the aperture 150 opening in the back wall 134 of the box 130 to secure the trunk cable 100 to the fiber optic enclosure 120.

FIG. 3 is a perspective view of a conventional trunk cable gland 60. As shown in FIG. 3, the trunk cable gland 60 includes a body 70 that has a cable passage 80 that extends from a first (front) end 72 to a second (back) end 74 of the body 70. The front end 72 of the body 70 has a smaller diameter than a central section 76 of the body 70 and includes a threaded outer surface. A nut 90 is releasably attached to the threaded outer surface.

FIG. 4 is a schematic side view illustrating how the trunk cable gland 60 may be used to support a trunk cable 10 that is fed into a fiber optic enclosure 120. As shown in FIG. 4, an aperture 150 (see FIG. 2) is provided in a sidewall 134 of the fiber optic enclosure 120. The trunk cable gland 60, with the nut 90 thereof removed, is mounted on the main cable 20 of trunk cable 10 so that the main cable goes through the cable passage 80 of the trunk cable gland 60. The breakout cords 30 and an end portion of the main cable 20 of the trunk cable 10 are routed through the aperture 150 in the back wall 134 of the fiber optic enclosure 120, and the front end 72 of the trunk cable gland 60 is also inserted through the aperture 150 in the wall 134. Each breakout cable 30 is threaded through the nut 90 so that the nut 90 may be slid onto the end portion of the main cable 20 until it contacts the front end 72 of the body 70 of trunk cable gland 60. The nut 90 is then threaded onto the front end 72 of the trunk cable gland 60. As the nut 90 is tightened onto the front end 72 of the body 70, the trunk cable gland 60 is pulled forwardly through the aperture 150 until the wall 134 is firmly captured between the nut 90 and the central portion 76 of the body 70, which has a diameter that is larger than the diameter of the aperture 150. In this fashion, the trunk cable gland 60 is securely (and releasably) mounted in the aperture 150 with the trunk cable 10 routed through the trunk cable gland 60 so that the trunk cable gland 60 supports the trunk cable 10 and so that any inadvertent tension or other forces on the trunk cable 10 is not transferred to the optical connectors 50.

SUMMARY

Pursuant to embodiments of the present invention, trunk gland adapters are provided that include an adapter body having an internal bore that has a front opening and a rear opening, the internal bore sized to receive a trunk cable gland so that a front end of the trunk cable gland extends through the front opening. These trunk gland adapters further include a plurality of attachment clips that are configured to releasably attach the adapter body to a mounting aperture in a wall of a fiber optic enclosure.

In some embodiments, the front opening of the internal bore may have a first diameter and the trunk cable gland may include a nut that is received on the front end of the trunk cable gland, the outer surface of the nut defining a second diameter that is larger than the first diameter. The internal bore may extend in a longitudinal direction, and the adapter body may include a longitudinal slot that extends from the front opening to the rear opening to provide access to the internal bore.

In some embodiments, an outer surface of the adapter body may have a generally cylindrical shape. The attachment clips may be snap clips that have release tabs that extend rearwardly beyond the rear opening of the adapter body. An inner surface of the adapter body may include stops that are configured to prevent rotation of the trunk cable gland when the trunk cable gland is fully received within the adapter body. In one embodiment, these stops may be ridges that project inwardly from the inner surface of the adapter body into the internal bore that generally define a hexagon. In another embodiment, the stops may be a first set of ridges that project inwardly from the inner surface of the adapter body into the internal bore that generally define a first hexagon and a second set of ridges that project inwardly from the inner surface of the adapter body into the internal bore that generally define a second hexagon that is larger than the first hexagon.

In some embodiments, the adapter body may be formed of a polymeric material. The attachment clips may extend rearwardly from the adapter body. The adapter body may be free to rotate within the mounting aperture when the adapter body is installed in the mounting aperture. The adapter body may include at least one radially outward projecting stop such as, for example, an outwardly projecting lip that has a diameter that exceeds a diameter of the mounting aperture.

Pursuant to further embodiments of the present invention, trunk gland units are provided that include a trunk cable gland and a trunk gland adapter. The trunk cable gland includes a cable gland body that has a front end that includes external threads, a rear end opposite the front end, a cable passage extending longitudinally from the front end to the rear end, and a removable nut that is threaded onto the external threads on the front end of the cable gland body. The trunk gland adapter has an adapter body having a front wall that has a front opening, a rear wall that has a rear opening and an internal bore that extends from the front opening to the rear opening. In these trunk gland units, the cable gland body is received within the internal bore so that the front end of the trunk cable gland extends through the front opening of the internal bore, and the trunk cable gland and the trunk gland adapter are configured to capture a wall of a fiber optic enclosure between the front wall of the trunk gland adapter and the removable nut when the trunk gland unit is installed in a aperture in the wall of the fiber optic enclosure.

In some embodiments, the internal bore extends in a longitudinal direction, and the adapter body includes a longitudinal slot that extends from the front opening to the rear opening to provide access to the internal bore. The trunk gland unit may also include a plurality of attachment clips extending rearwardly from the adapter body that are configured to releasably attach the adapter body within the mounting aperture in the wall of the fiber optic enclosure. The attachment clips may be snap clips that have release tabs that extend rearwardly beyond the rear opening. The front opening of the internal bore may have a first diameter and the removable nut may have a second diameter that is larger than the first diameter.

In some embodiments, an inner surface of the adapter body may include a plurality of stops that are configured to prevent rotation of the trunk cable gland when the trunk cable gland is fully received within the trunk gland adapter. The plurality of stops may be a plurality of ridges projecting inwardly from the inner surface of the adapter body into the internal bore that generally define a hexagon. A rear end of the body may include at least one radially projecting stop that is sized to prevent the trunk gland adapter from passing completely through the aperture in the wall of the fiber optic enclosure.

Pursuant to additional embodiments of the present invention, methods of routing a trunk cable into an enclosure through an aperture in a wall of the enclosure are provided in which a trunk cable gland that has a trunk cable extending through a cable passage thereof is inserted into the trunk gland adapter so that a front end of the trunk cable gland extends forwardly through an opening in a front wall of the trunk gland adapter. A nut is threaded onto the front end of the trunk cable gland to capture the front wall of the trunk gland adapter between the nut and a central portion of the body of the trunk cable gland. A plurality of breakout cables of the trunk cable are routed through the aperture into the enclosure. A front portion of the trunk gland adapter is inserted into the aperture in the wall of the fiber optic enclosure. Finally, the trunk gland adapter is locked into the aperture.

In some embodiments, the trunk gland adapter may have an adapter body having an internal bore and a plurality of attachment clips that are configured to releasably attach the adapter body within the aperture in the wall of the enclosure.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings:

FIG. 1 is a schematic perspective view of a conventional fiber optic trunk cable that includes a plurality of breakout cables on one end thereof.

FIG. 3 is a perspective view of a conventional trunk cable gland.

FIG. 4 is a schematic side view illustrating how a trunk cable gland may be mounted in an aperture in a wall of a fiber optic enclosure.

DETAILED DESCRIPTION

Pursuant to embodiments of the present invention, trunk gland adapters are provided that may be used to mount fiber optic trunk cable glands in mounting apertures. The trunk gland adapters according to embodiments of the present invention may provide "quick fit" functionality so that trunk cable glands may be installed in mounting apertures of fiber optic enclosures simply by installing the trunk cable gland in the trunk gland adapter to form a trunk gland unit and then snapping the trunk gland unit in place in the mounting aperture. The trunk gland adapters according to embodiments of the present invention may also have "quick release" functionality such that a technician may readily detach the trunk gland adapter (and the trunk cable gland therein) from a mounting aperture by activating one or more quick release mechanisms such as, for example, spring tabs on the trunk gland adapter. The trunk gland adapters according to embodiments of the present invention may eliminate any need for technicians to reach inside fiber optic enclosures to mount a nut on an end of a trunk cable gland in order to mount the trunk cable gland in a mounting aperture of the fiber optic enclosure.

In some embodiments, the trunk gland adapters may be sized so that they may receive multiple different sizes of trunk cable glands. This may simplify manufacturing operations and inventory control. Additionally, the trunk gland adapters according to embodiments of the present invention may include one or more stops that are formed in an inner surface of the body of the trunk gland adapter that are configured to prevent rotation of a trunk cable gland when the trunk cable gland is fully received within the trunk cable adapter. These stops may prevent the trunk cable gland from rotating when the nut is threaded onto the front end of the trunk cable gland to lock the trunk cable gland within the trunk gland adapter.

The trunk gland adapters according to embodiments of the present invention may also include longitudinal slots that provide access to an internal bore thereof. The provision of the longitudinal slot allows the breakout cords of a trunk cable to be inserted within the trunk gland adapter without any need to thread the breakout cables through the trunk gland adapter.

Example embodiments of the present invention will now be described with reference to the attached drawings.

Figure 2A:
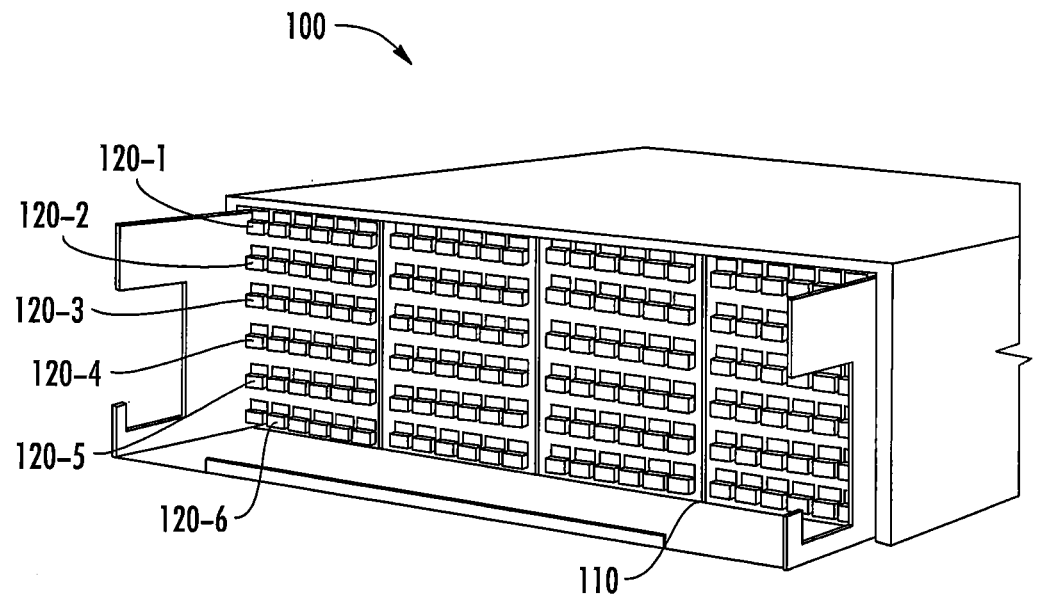
FIG. 2A is a perspective view of a conventional fiber optic shelf unit.
Figure 2B:
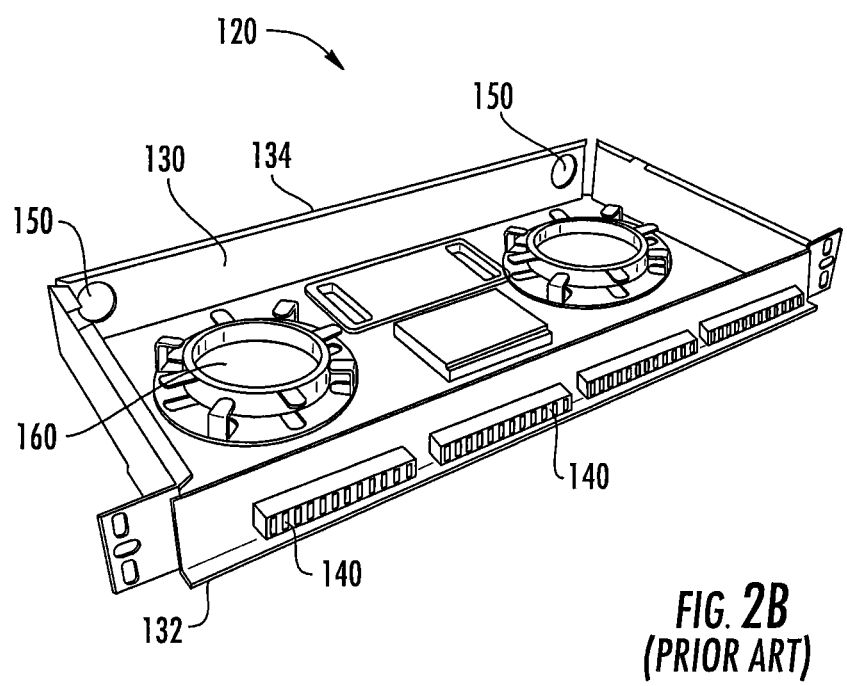
FIG. 2B is a top perspective view of a fiber optic enclosure that may be mounted in one of the shelves of the fiber optic shelf unit of FIG. 2A.
Figure 5:
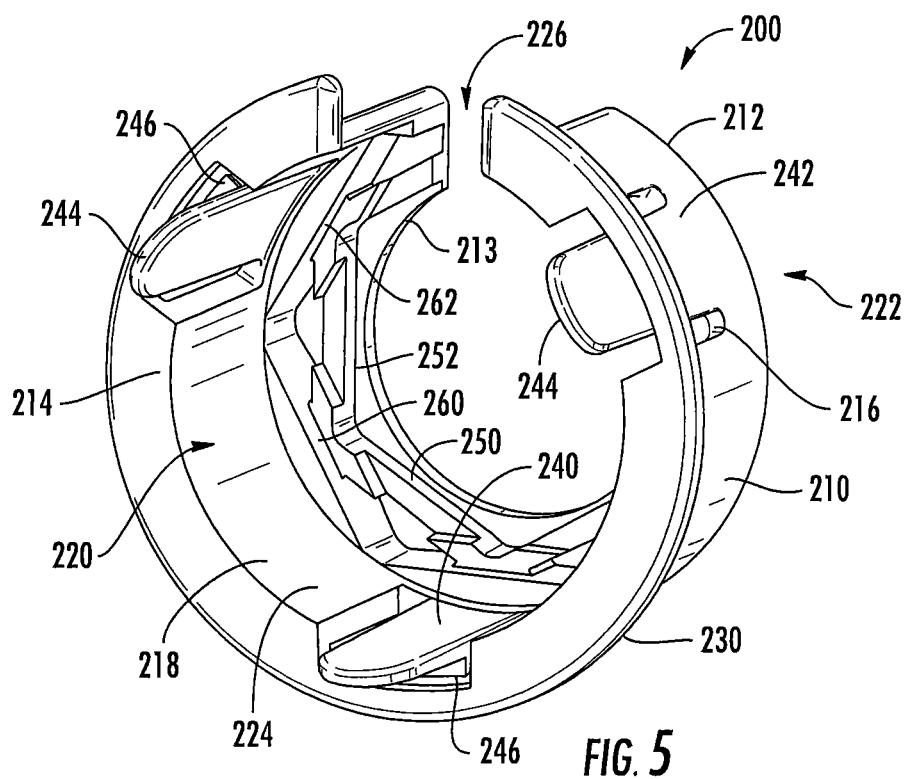
FIG. 5 is a perspective rear view of a trunk gland adapter according to embodiments of the present invention.
Figure 6:
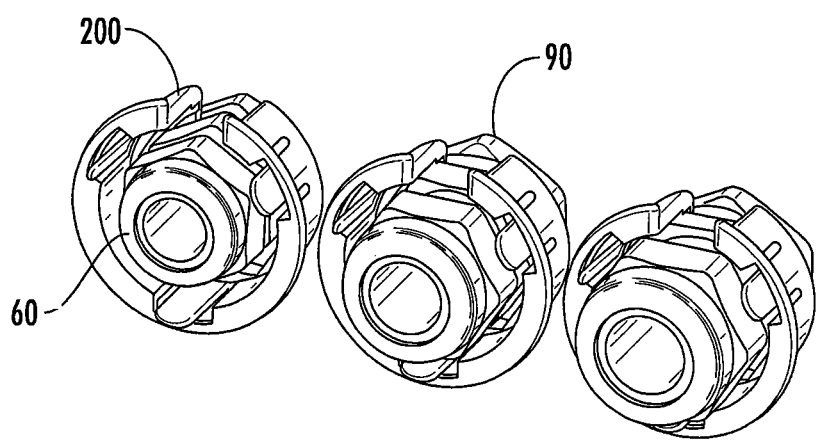
FIG. 6 is a perspective front view of several of the trunk gland adapters of FIG. 5 with trunk cable glands mounted therein.
Figure 7:
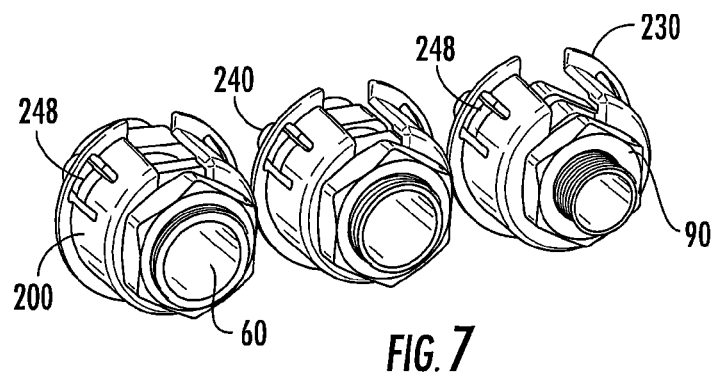
FIG. 7 is a perspective rear view of several of the trunk gland adapters of FIG. 5 with trunk cable glands mounted therein.

FIG. 5 is a perspective rear view of a trunk gland adapter 200 according to embodiments of the present invention. FIGS. 6 and 7 are, respectively, a perspective front view and a perspective rear view of several of the trunk gland adapters of FIG. 5 with different-sized trunk cable glands mounted therein.

Referring to FIGS. 5-7, the trunk gland adapter 200 includes a generally cylindrical body 210 that has a front end 212 and a rear end 214. The front end 212 includes a front wall 213. A longitudinal bore 220 extends through the body 210 from the front end 212 to the rear end 214. The longitudinal bore 220 includes a front opening 222 that is formed in the front wall 213 and a rear opening 224. The longitudinal bore 220 exposes an inner surface 218 of the body 210. The body 210 includes a longitudinal slot 226 that extends from the front end 212 to the rear end 214. The slot 226 provides access to the longitudinal bore 220. The rear end 214 includes a radially outwardly projecting annular lip 230.

A plurality of spring tabs 240 project from the rear end 214 of the body 210. Each spring tab 240 is located in a corresponding recess 216 in the rearward portion of the body 210. Each spring tab 240 has a fixed end 242 and a distal end 244, and extends rearwardly parallel to a longitudinal axis of the adapter 200. The spring tabs 240 are mounted in a cantilevered fashion so that they may be depressed radially inwardly. A catch 246 is provided on a middle portion of an outside surface of each spring tab 240. Operation of the spring tabs 240 will be discussed in more detail below.

The inner surface 218 of the body 210 includes a plurality of inwardly projecting stops 250, 260 that are designed to prevent rotation of a trunk cable gland such as trunk cable gland 60 when the trunk cable gland 60 is fully installed within the trunk gland adapter 200. Referring to FIG. 3, the central portion 76 of the body 70 of trunk cable gland 60 has a regular hexagonal cross-section shape for cross-sections taken along the longitudinal direction. Most trunk cable glands include bodies having such regular hexagonal profiles that have the shape of a standard nut as this allows a technician to hold the body 70 in place with a wrench when tightening the nut 90 onto the externally-threaded front portion 72 of the body 70. Herein, regular hexagons will simply be referred to as "hexagons" for the sake of simplicity. The inwardly projecting stops 250 comprise a series of radially-inwardly projecting bars that generally define a first hexagonal cavity 252. This first hexagonal cavity 252 is sized to receive the central portion 76 of the body 70 of a trunk gland of a particular size. The inwardly projecting stops 260 similarly comprise a series of radially-inwardly projecting bars that generally define a second hexagonal cavity 262. This second hexagonal cavity 262 is sized to receive the central portion 76 of the body 70 of a larger trunk gland. FIGS. 6 and 7 illustrate several different sized trunk cable glands 60 received within trunk gland adapters 200.

For example, two of the most common sizes for the nut-shaped central portion 76 of the body of a trunk cable gland are central portions 76 that have a hexagonal shape with a side-to-side diameter of either ½" or ⅜". In the embodiment depicted in FIG. 5, the projecting stops 250 form a first hexagonal cavity 252 that is sized to receive a ⅜" hexagonal nut. The projecting stops 260 form a second hexagonal cavity 262 that is sized to receive a ½" hexagonal nut. The longitudinal bore 220 has a diameter that is sufficiently large to accommodate either a ⅜" trunk cable gland or a ½" trunk cable gland. Thus, the trunk cable adapter 200 may be used with either size trunk cable gland.

Once a trunk cable gland 60 (of either size) is fully received within the trunk gland adapter 200, the central portion 76 of the body 70 of the trunk cable gland 60 is received within the hexagonal cavity 262 (for ½" trunk cable glands) or both the hexagonal cavities 252 and 262 (for ⅜" trunk cable glands), which act to prevent the trunk cable gland 60 from rotating within the trunk gland adapter 200. A technician may then place the nut 90 on the front portion of the body 70 and tighten the nut 90 so as to capture the front wall 213 of the trunk cable adapter 200 between the nut 90 and the central portion 76 of the body 70, thereby locking the trunk cable gland 60 within the trunk cable adapter 200 (with the nut 90 and the front portion 72 of the body 70 of the trunk cable gland 60 projecting forwardly through the front opening 222 in the trunk cable adapter 200). As the nut 90 is tightened, the appropriate stops 250 or 260 prevent the trunk cable gland 60 from rotating without any need for the technician to use a wrench to hold the body 70 of the trunk cable gland 60 still.

Figure 8:
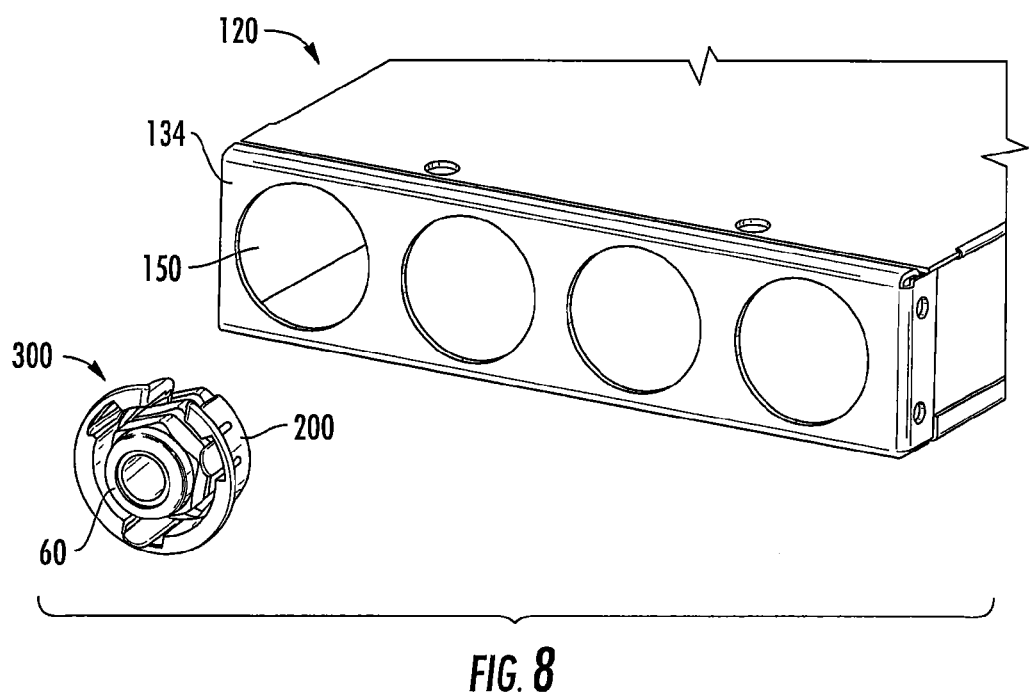
FIG. 8 is a perspective view of a trunk gland unit that includes a trunk cable gland that that is mounted in a trunk gland adapter according to embodiments of the present invention and a mounting aperture that the trunk gland unit may be mounted into.

FIG. 8 illustrates a trunk gland unit 300 that comprises a trunk cable gland 60 that has been mounted in a trunk gland adapter 200 in the manner discussed above. Also shown in FIG. 8 is a fiber optic enclosure 120 that has a back wall 134 with a plurality of mounting apertures 150 therein. The trunk gland unit 300 may be mounted in one of the mounting apertures 150 as follows.

The spring tabs 240 that project from the rear end 214 of the body 210 comprise attachment clips that may be used to mount the trunk gland adapter 200 in the mounting aperture 150. The spring tabs 240 define a circle having a diameter that is, for example, slightly smaller than the diameter of the mounting aperture 150. Radially outer edges of the outwardly projecting catches 246 that are provided on the spring tabs 240, in contrast, define a circle that has a diameter that is larger than the diameter of the mounting aperture 150. The trunk gland unit 300 is inserted into one of the mounting apertures 150 so that the front end 212 of the trunk gland adapter 200 is received within the interior of the fiber optic enclosure 120. The outwardly projecting catches 246 have a beveled outer surface 248 (see FIG. 7). As the spring tabs 240 are formed of a resilient material and comprise cantilevered members, they can flex inwardly when a force is applied thereto. As the trunk gland unit 300 is inserted into the mounting apertures 150, the back wall 134 of the fiber optic enclosure 120 contacts the beveled outer surface 248 of the catches 246 and exerts a force thereon that deflects the spring tabs 240 inwardly. Once the catches 246 have passed through the mounting aperture 150 into the interior of the fiber optic enclosure 120, the force on each catch 246 is removed and the spring tabs 240 return to their normal resting positions. When this occurs, the portion of the back wall 134 that defines the mounting aperture 150 is captured between the rear face of each catch 246 and the front face of the annular lip 230, thereby locking the trunk gland unit 300 in place within the mounting aperture 150. Thus, a technician may readily install the trunk gland unit 300 in the mounting aperture 150 and lock the trunk gland unit 300 in place simply by inserting the trunk gland unit 300 into the mounting aperture 150 and pushing the trunk gland unit 300 as far forward as it can be inserted so that the wall 134 defining the mounting aperture 150 is captured between the catches 246 and the annular lip 230.

The trunk gland adapter 200 may rotate relatively freely within the mounting aperture 150. Trunk cables such as trunk cable 10 typically cannot rotate freely within a conventional trunk cable gland 60. As a result, when forces are imparted onto the trunk cable 10, the trunk cable 10 may not relieve some of these forces by rotating in response thereto. Consequently, there is an increased possibility that such forces may damage one or more of the optical fibers in the trunk cable 10. However, with the trunk gland units 300 according to embodiments of the present invention, the trunk gland adapter may rotate within the mounting aperture. Accordingly, when rotational forces are imparted on the trunk cable 10, the trunk cable 10 and the trunk gland unit 300 may rotate within the mounting aperture 150.

A technician may remove the trunk gland unit 300 from the mounting aperture 150 simply by pressing inwardly on each of the spring tabs 240 so that the catches 246 are drawn sufficiently inwardly so that the trunk gland unit 300 may be pulled rearwardly out of the mounting aperture 150. Thus, the trunk gland units according to embodiments of the present invention may exhibit both quick-install and quick-release functionality.

FIGS. 9A-9D are a series of schematic perspective views illustrating how the trunk cable adapters according to embodiments of the present invention may be used to mount a trunk cable gland in an mounting aperture of a fiber optic enclosure in order to support a fiber optic trunk cable that is received within the fiber optic enclosure.

Figure 9A:
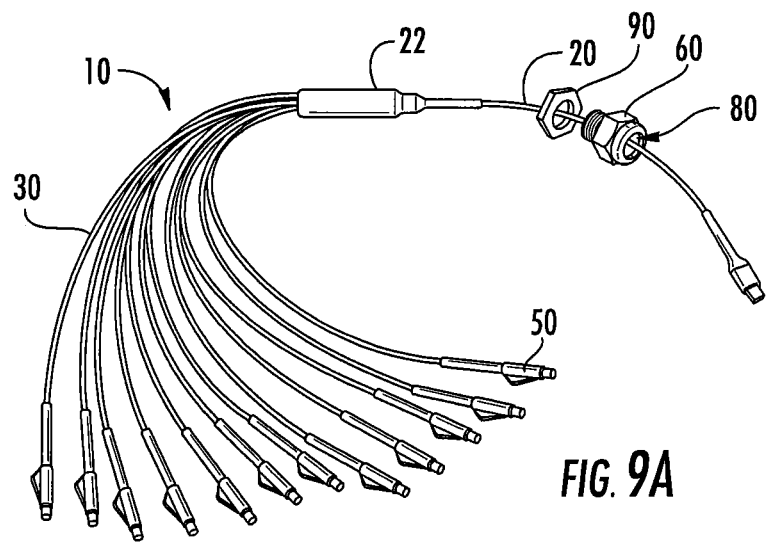
FIGS. 9A-9D are a series of schematic perspective views illustrating how the trunk cable adapters according to embodiments of the present invention may be used to mount a trunk cable gland in an aperture of a fiber optic enclosure in order to secure a fiber optic trunk cable to the fiber optic enclosure.
Figure 9B:
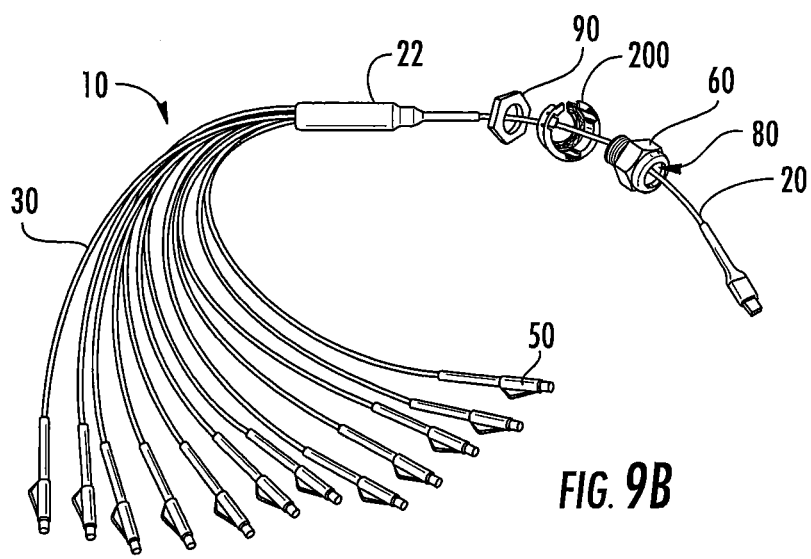

As shown in FIG. 9A, a technician may first thread the breakout cables 30 of a trunk cable 10 through the cable passage 80 of a trunk cable gland 60 (note that the trunk cable gland 60 is often preinstalled on the trunk cable 10 at the time of manufacture or connectorization). Next, the technician may separate the nut 90 from the trunk cable gland 60 and move the nut 90 forwardly along the breakout cables 30. Referring to FIG. 9B, the technician may next install the trunk gland adapter 200 on the breakout cables 30 between the trunk cable gland 60 and the nut 90. As the trunk gland adapter 200 includes the longitudinal slot 226, the trunk gland adapter 200 may be installed on the breakout cables 30 by simply pushing each breakout cable 30 through the slot 226 into the interior of the trunk gland adapter 200.

Figure 9C:
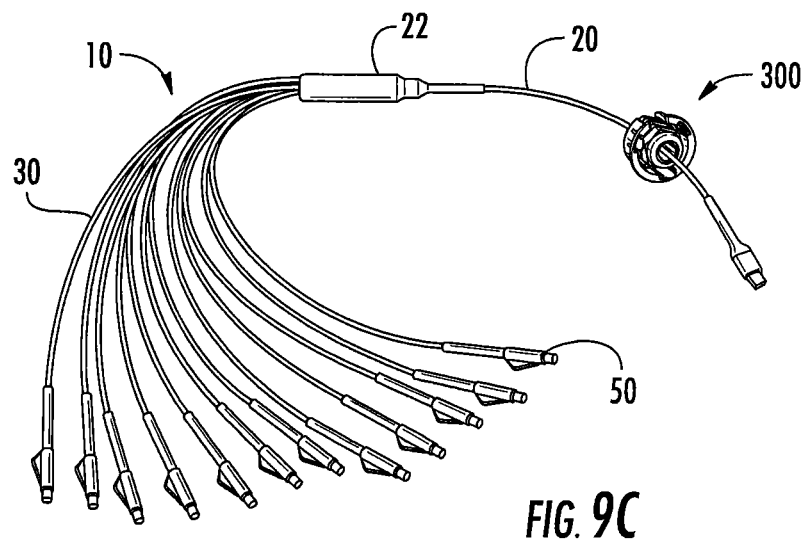

Referring to FIG. 9C, the technician may next insert the trunk cable gland 60 within the trunk gland adapter 200 so that the externally threaded front end 72 of the trunk cable gland body 70 extends forwardly through the front opening 222 in the trunk gland adapter 200. The nut 90 of the trunk cable gland 60 is then tightened onto the externally threaded front end 72 of the trunk cable gland body 70 so that the front wall 213 of the trunk gland adapter 200 is captured between the nut 90 and the hexagonal central portion 76 of the trunk cable gland body 70. In this manner, a trunk gland unit 300 is formed that comprises a trunk cable gland 60 that is mounted within a trunk gland adapter 200.

Figure 9D:
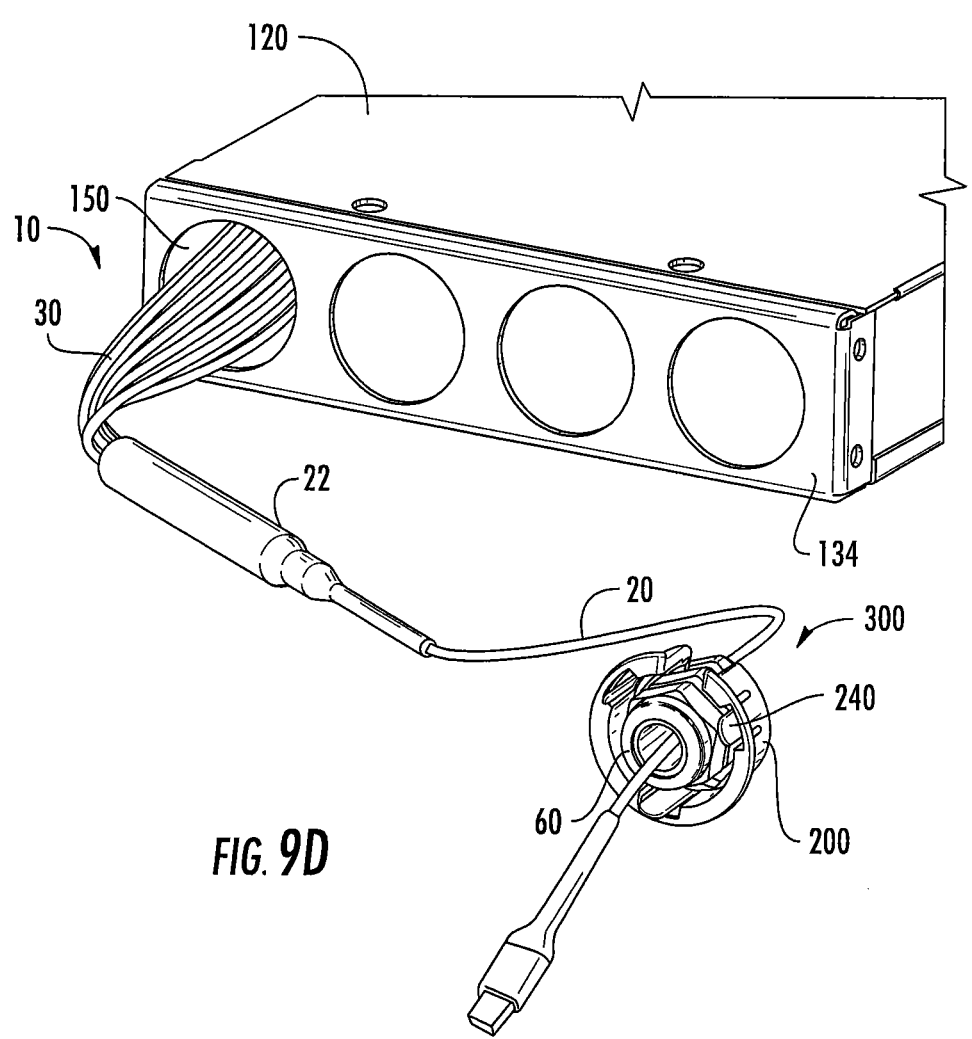

Referring to FIG. 9D, next, the ends of the breakout cables 30 are routed through a mounting aperture 150 in a wall 134 of a fiber optic enclosure 120 into the interior of the fiber optic enclosure 120. The trunk gland unit 300 is then moved forwardly into the mounting aperture 150 until the catches 246 on the spring tabs 240 pass through the mounting aperture 150 to lock the trunk gland unit 300 in place in the mounting aperture 150. The connectors 50 on the breakout cables 30 may then be connected to the fiber optic adapters 140 of the fiber optic enclosure 120.

Figure 10A:
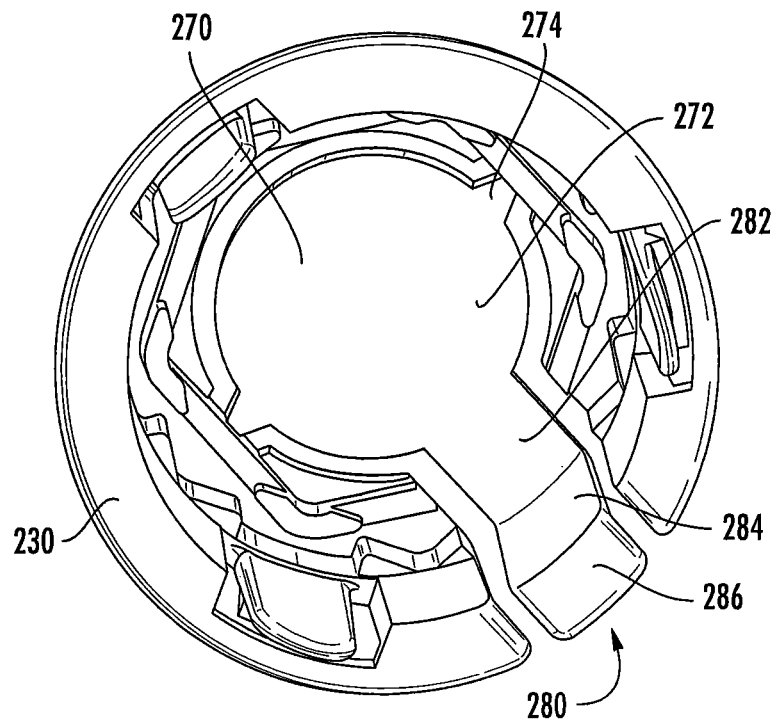
FIGS. 10A-10B are perspective views of a trunk gland adapter according to further embodiments of the present invention that includes a detachable plug.
Figure 10B:
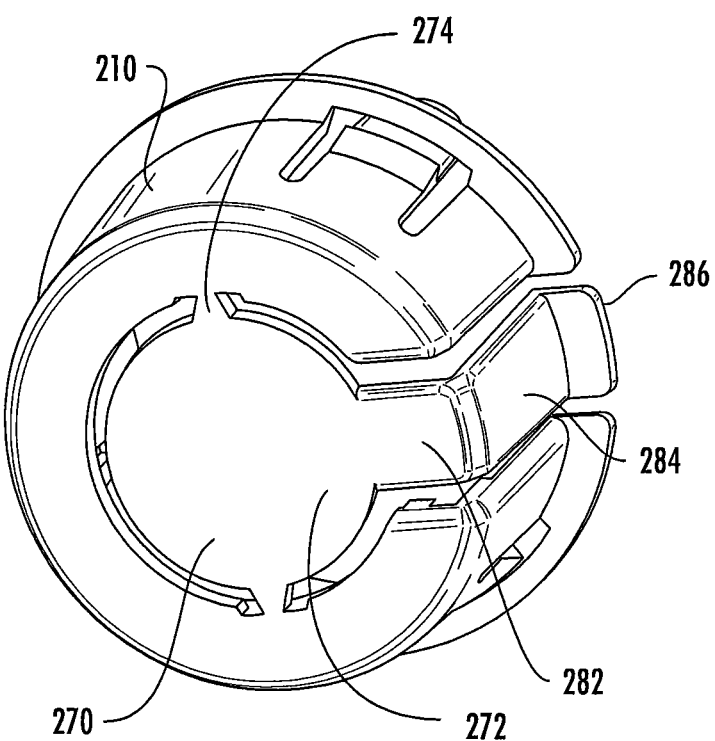

FIGS. 10A-10B are perspective views of a trunk gland adapter 200' according to further embodiments of the present invention that includes a detachable plug 270. The trunk gland adapter 200' may be almost identical to the trunk gland adapter 200 that is depicted in FIG. 5. However, the trunk gland adapter 200' further includes the plug 270 that substantially covers the front opening 222 of the longitudinal bore 220. In some embodiments, the only difference between the trunk gland adapter 200' and the trunk gland adapter 200 may be the plug 270. Accordingly, the other elements of trunk gland adapter 200' will not be re-described here as they have already been described above with reference to FIG. 5.

Referring to FIGS. 10A-10B, the plug 270 includes a disk portion 272 that may be sized to fit within the front opening 222. One or more tabs 274 may extend outwardly from the disk portion 272 to connect the plug 270 to the cylindrical body 210. The plug 270 further includes an arm 280. The arm 280 has a first segment 282 that connects to the disk portion 270, a second segment 284 that is at a right angle to the first segment 282 and a third segment 286 that is at a right angle to the second segment 284 and substantially parallel to the first segment 282. The first and second segments 282, 284 of arm 280 may substantially fill the longitudinal slot 226 in the cylindrical body 210, and the third segment 286 may substantially complete the annular lip 230.

The plug 270 allows the gland adapter 200' to serve as a hole plug that may be used to substantially cover a hole in a mounting aperture 150 of a fiber optic enclosure 120. Moreover, the tabs 274 allow the plug 270 to be readily removed from the trunk gland adapter 200' simply by moving the arm 280 back and forth so that the tabs 274 detach from the body 210. Once the plug 270 is removed, the trunk gland adapter 200' may be identical to the trunk gland adapter 200 described above and ready for use in the manner described above.

The trunk gland adapters and trunk gland units according to embodiments of the present invention provide a number of advantages as compared to conventional trunk cable glands. In particular, as discussed above, to mount a trunk cable gland 60 in a mounting aperture of a fiber optic enclosure 120 using conventional techniques it is necessary to tighten the nut 90 of the trunk cable gland 60 onto the front end 72 of the trunk cable gland 60 after the trunk cable gland 60 has been inserted into the mounting aperture 150. The interior of the fiber optic enclosure 120 is often crowded with breakout cables 30 and fiber optic cable routing features 160. As such, it may be difficult for a technician to readily tighten the nut 90 onto the trunk cable gland 60. This is particularly the case as the technician may need to simultaneously use a wrench to hold the body 70 of the trunk cable gland 60 so that the body 70 does not rotate as the technician threads the nut 90 into the body 70. The same difficulties arise when a technician seeks to remove a trunk cable gland 60 from a mounting aperture 150.

In contrast, with the trunk gland adapters 200 and the trunk gland units 300 according to embodiments of the present invention, a technician may install a trunk cable gland 60 into a mounting aperture 150 by simply inserting the trunk gland unit 300 into the mounting aperture 150. While the trunk cable gland 60 must be installed within the trunk gland adapter 200, this installation occurs outside of the fiber optic enclosure 120 where the technician has plenty of space to work. Moreover, the stops 250, 260 may prevent the trunk cable gland 60 from rotating when it is installed within the trunk gland adapter 200, thereby eliminating any need for the technician to use a wrench to hold the trunk cable gland 60 still during the installation procedure. The trunk gland adapters 200 and the trunk gland units 300 according to embodiments of the present invention also provide "quick-release" functionality as they may be removed from the mounting aperture 150 simply by pressing the spring tabs 240 inwardly and pulling the trunk gland unit 300 out of the mounting aperture 150.

The trunk gland adapters 200 according to embodiments of the present invention may also be sized to receive multiple different sizes of trunk cable glands. This simplifies production and inventory control. Moreover, the mounting apertures 150 in the fiber optic enclosure 120 may all be designed to have the same size regardless of the size of trunk cable gland that is to be mounted therein.

While in the above description the trunk gland adapters and trunk gland units are used to mount a trunk cable gland in a mounting aperture of a fiber optic enclosure that may be inserted into a fiber optic shelf unit, it will be appreciated that the trunk gland adapters and trunk gland units according to embodiments of the present invention may be used to mount trunk cable glands in any mounting aperture. Thus, it will be appreciated that the term "fiber optic enclosure" as used herein may refer to any item of fiber optic apparatus including, for example, fiber optic shelf enclosures, fiber optic routing boxes, fiber optic patch panels with mounting brackets, etc.

While the trunk gland adapters and trunk gland units are described above as being used with fiber optic trunk cables, it will be appreciated that they may also be used with other forms of trunk cables that have breakout cables. For example, twenty-five pair Ethernet cables that have a plurality of breakout cables on one end may be used with the trunk gland adapters and trunk gland units according to embodiments of the present invention. As known to those of skill in the art, twenty-five pair Ethernet cables refer to cables that include fifty insulated conductors such as insulated copper wires that are arranged as twenty-five twisted pairs of insulated conductors. In "breakout" versions of these cables, one end of the cable has all twenty-five pairs within a common jacket while the other end of the cable comprises twenty-five separately jacketed breakout cables that each include a single twisted pair. The trunk gland adapters and trunk gland units according to embodiments of the present invention may also be used on twenty-four pair and forty-eight pair Ethernet trunk cables that are known in the art that include breakout cables on one end thereof that each have four pairs of insulated conductors. The trunk gland adapters and trunk gland units may also be used on coaxial trunk cables such as Twinnex coaxial cables that include multiple coaxial cables in a single trunk cable on one end of the cable and multiple breakout cables on the other end.

Numerous changes may be made to the trunk gland adapter 200 depicted above without departing from the scope of the present invention. For example, while the trunk gland adapter 200 includes a plurality of spring tabs 240 that are used to releasably lock the trunk gland adapter 200 in a mounting aperture 150, a wide variety of quick-release mechanism could be used. For example, in other embodiments, a single spring tab 240 may be used along with a catch that is on the external surface of the body 210 opposite the spring clip 240. Moreover, a wide variety of spring clips or similar structures that may be forced inwardly and that then "snap" back into their resting position may be used. In some embodiments, the spring tabs may not be accessible to a technician and instead a technician may use a tool to release the attachment clips in order to remove the trunk gland adapter from a mounting aperture.

It will likewise be appreciated that the stops 250, 260 are optional features that may be omitted in some embodiments, as may the longitudinal slot 226. The body 210 may be shaped to fit apertures other than circular apertures such as, for example, square apertures, hexagonal apertures, etc. As another example, the annular lip 230 may be replaced with two or more radially outwardly projecting stops.

Embodiments of the present invention have been described above with reference to the accompanying drawings, in which embodiments of the invention are shown. It will be appreciated, however, that this invention may, however, be embodied in many different forms and should not be construed as limited to the embodiments set forth above. Rather, these embodiments are provided so that this disclosure will be thorough and complete, and will fully convey the scope of the invention to those skilled in the art. Like numbers refer to like elements throughout.

It will be understood that, although the terms first, second, etc. are used throughout this specification to describe various elements, these elements should not be limited by these terms. These terms are only used to distinguish one element from another. For example, a first element could be termed a second element, and, similarly, a second element could be termed a first element, without departing from the scope of the present invention. The term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

It will be understood that when an element is referred to as being "on another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "lateral" or "vertical" may be used herein to describe a relationship of one element, layer or region to another element, layer or region as illustrated in the figures. It will be understood that these terms are intended to encompass different orientations of the device in addition to the orientation depicted in the figures.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A trunk gland adapter, comprising:
   an adapter body having an internal bore that has a front opening and a rear opening, the internal bore sized to receive a trunk cable gland so that a front end of the trunk cable gland extends through the front opening; and
   a plurality of attachment clips that are configured to releasably attach the adapter body to a mounting aperture in a wall of a fiber optic enclosure,
   wherein the front opening of the internal bore has a first diameter and the trunk cable gland includes a nut that is received on the front end of the trunk cable gland, the outer surface of the nut defining a second diameter that is larger than the first diameter.

2. The trunk gland adapter of claim 1, wherein the internal bore extends in a longitudinal direction, and wherein the adapter body includes a longitudinal slot that extends from the front opening to the rear opening and that provides access to the internal bore.

3. The trunk gland adapter of claim 1, wherein the attachment clips comprise snap clips that have release tabs that extend rearwardly beyond the rear opening of the adapter body.

4. The trunk gland adapter of claim 1, wherein an inner surface of the adapter body includes a plurality of stops that are configured to prevent rotation of the trunk cable gland when the trunk cable gland is fully received within the adapter body.

5. The trunk gland adapter of claim 4, wherein the plurality of stops comprise a plurality of ridges projecting inwardly from the inner surface of the adapter body into the internal bore that generally define a hexagon.

6. The trunk gland adapter of claim 4, wherein the plurality of stops comprise a first plurality of ridges projecting inwardly from the inner surface of the adapter body into the internal bore that generally define a first hexagon and a second plurality of ridges projecting inwardly from the inner surface of the adapter body into the internal bore that generally define a second hexagon that is larger than the first hexagon.

7. The trunk gland adapter of claim 1, wherein the adapter body is free to rotate within the mounting aperture when the adapter body is installed in the mounting aperture.

8. The trunk gland adapter of claim 1, wherein the adapter body includes at least one radially outward projecting stop.

9. The trunk gland adapter of claim 1, further comprising a detachable plug that substantially covers the front opening of the internal bore.

10. A trunk gland unit, comprising:
    a trunk cable gland having a cable gland body that has a front end that includes external threads, a rear end opposite the front end, a cable passage extending longitudinally from the front end to the rear end, and a removable nut that is threaded onto the external threads on the front end of the cable gland body; and
    a trunk gland adapter having an adapter body having a front wall that has a front opening, a rear wall that has a rear opening and an internal bore that extends from the front opening to the rear opening,
    wherein the cable gland body is received within the internal bore so that the front end of the trunk cable gland extends through the front opening of the front wall,
    wherein the trunk cable gland and the trunk gland adapter are configured to capture a wall of a fiber optic enclosure between the trunk gland adapter and the removable nut so that a portion of the adapter body extends through the wall of the fiber optic enclosure when the trunk gland unit is installed in an aperture in the wall of the fiber optic enclosure, and
    wherein the front opening of the front wall has a first diameter and the removable nut has a second diameter that is larger than the first diameter.

11. The trunk gland unit of claim 10, further comprising a plurality of attachment clips extending rearwardly from the adapter body that are configured to releasably attach the adapter body within the mounting aperture in the wall of the fiber optic enclosure.

12. The trunk gland unit of claim 11, wherein the attachment clips comprise snap clips that have release tabs that extend rearwardly beyond the rear opening.

13. The trunk gland unit of claim 10, wherein an inner surface of the adapter body includes a plurality of stops that are configured to prevent rotation of the trunk cable gland when the trunk cable gland is fully received within the trunk gland adapter.

14. The trunk gland unit of claim 13, wherein the plurality of stops comprise a plurality of ridges projecting inwardly from the inner surface of the adapter body into the internal bore that generally define a hexagon.

15. The trunk gland unit of claim 14, wherein the plurality of stops comprise a first plurality of ridges projecting inwardly from the inner surface of the adapter body into the internal bore that generally define a first hexagon and a second plurality of ridges projecting inwardly from the inner surface of the adapter body into the internal bore that generally define a second hexagon that is larger than the first hexagon.

16. The trunk gland unit of claim 10, wherein a rear end of the adapter body includes at least one radially projecting stop that is sized to prevent the trunk gland adapter from passing completely through the aperture in the wall of the fiber optic enclosure.

17. The trunk gland unit of claim 10, wherein the removable nut has an outer diameter that is smaller than a diameter of the aperture in the wall of the fiber optic enclosure.

18. A trunk gland unit, comprising:
a trunk cable gland having a cable gland body that has a front end that includes external threads, a rear end opposite the front end, a cable passage extending longitudinally from the front end to the rear end, and a removable nut that is threaded onto the external threads on the front end of the cable gland body; and
a trunk gland adapter having an adapter body having a front wall that has a front opening, a rear wall that has a rear opening and an internal bore that extends from the front opening to the rear opening,
wherein the cable gland body is received within the internal bore so that the front end of the trunk cable gland extends through the front opening of the front wall,
wherein the trunk cable gland and the trunk gland adapter are configured to capture a wall of a fiber optic enclosure between the trunk gland adapter and the removable nut so that a portion of the adapter body extends through the wall of the fiber optic enclosure when the trunk gland unit is installed in an aperture in the wall of the fiber optic enclosure, and
wherein the internal bore extends in a longitudinal direction, and wherein the adapter body includes a longitudinal slot that extends from the front opening to the rear opening and that provides access to the internal bore.

* * * * *